United States Patent [19]
Ginzboorg

[11] Patent Number: 6,018,519
[45] Date of Patent: Jan. 25, 2000

[54] OVERLOAD PREVENTION IN A TELECOMMUNICATIONS NETWORK NODE

[75] Inventor: Philip Ginzboorg, Helsinski, Finland

[73] Assignee: Nokia Telecommunications Oy, Espoo, Finland

[21] Appl. No.: 08/836,257

[22] PCT Filed: Nov. 10, 1995

[86] PCT No.: PCT/FI95/00616

§ 371 Date: May 9, 1997

§ 102(e) Date: May 9, 1997

[87] PCT Pub. No.: WO96/15609

PCT Pub. Date: May 23, 1996

[30] Foreign Application Priority Data

Nov. 11, 1994 [FI] Finland ..................... 945331

[51] Int. Cl.[7] .................... H04L 12/56
[52] U.S. Cl. ............. 370/236; 370/410; 370/522; 379/230
[58] Field of Search ..................... 379/219, 220, 379/213, 196, 239, 134, 133, 139, 230, 229; 370/428, 239, 410, 236, 448, 252, 522, 230, 232, 233, 234, 235

[56] References Cited

U.S. PATENT DOCUMENTS 4,224,479  9/1980  Crawford .
4,409,592  10/1983  Hunt ..................... 340/825.5

(List continued on next page.)

FOREIGN PATENT DOCUMENTS 425 202  5/1991  European Pat. Off. .

OTHER PUBLICATIONS

Proceeding of the IEEE, vol. 80, No. 4, Apr. 1992, B.Jabbari, "Routing and Congestion Control in Common Channel Signaling System No. 7" pp. 607–617.

"Introduction to CCITT Signalling System No. 7," Recommendation Q.700, International Telecommunication Union, (Melbourne 1988; modified at Helsinki 1993), pp. 1–20.

"Network Management Controls," ITU–T Recommendation E.412, International Telecommunications Union, (Revised in 1996), pp. 1–17.

"Digital Exchange Design Objectives—Operations and Maintenance," Recommendation Q.542, International Telecommunication Union, (Melbourne 1988; modified at Helsinski 1993), pp. 1–21.

European Telecommunications Standard Institute, standard ETSI in CS1 INAP Part 1: Protocol Specification, Draft prETS 300 374–1, Nov. 1993.

*Primary Examiner*—Chau Nguyen
*Attorney, Agent, or Firm*—Pillsbury Madison & Sutro

[57] ABSTRACT

A method and arrangement for preventing an overload in a node of a telecommunications network, the network including at least one service node and at least one other node connected to the at least one service node, by the steps of: receiving, at the at least one service node, service requests from the at least one other node connected to the at least one service node; transmitting restriction requests from the at least one service node to the at least one other node connected thereto, each restriction request containing information on how the at least one other node should restrict the number of service requests the at least one other node transmits towards the at least one service node; transmitting a new restriction request at least whenever the information changes; and restricting the number of service requests transmitted to the at least one service node from the at least one other node. The step of transmitting the restriction requests includes transmitting restriction requests in response to a predetermined proportion of the total number of the received service request messages fulfilling a predetermined criterion, by defining for each individual one of the received service requests a predetermined probability of triggering a transmission of a restriction request, so that a total number of the transmitted restriction requests is smaller than the total number of received service requests.

11 Claims, 7 Drawing Sheets

U.S. PATENT DOCUMENTS

| | | |
|---|---|---|
| 5,029,164 | 7/1991 | Goldstein et al. . |
| 5,060,258 | 10/1991 | Turner . |
| 5,309,431 | 5/1994 | Tominaga et al. . |
| 5,425,086 | 6/1995 | Hidaka et al. . |
| 5,719,930 | 2/1998 | MacDonald et al. .................... 379/229 |
| 5,778,057 | 7/1998 | Atai ......................................... 379/220 |
| 5,825,860 | 10/1998 | Moharram ............................... 379/133 |
| 5,881,137 | 3/1999 | Ginzboorg et al. ..................... 379/113 |
| 5,898,672 | 4/1999 | Ginzboorg ............................... 370/236 |

OVERLOAD PREVENTION IN A TELECOMMUNICATIONS NETWORK NODE

This application is the national phase of international PCT/FI95/00616, filed Nov. 10, 1995 which designated the U.S.

FIELD OF THE INVENTION

The invention relates generally to traffic control in telecommunication networks. More specifically, the invention relates to a method and an arrangement for preventing an overload in a telecommunication network.

The invention is intended especially for so-called Intelligent Networks (IN) that are being developed at present, but the same principle can be applied in any network wherein two or more nodes are interconnected in such a way that at least one of the nodes can be loaded by one or several other nodes.

BACKGROUND OF THE INVENTION

An Intelligent Network usually refers to a network comprising more intelligence (i.e. a better ability to utilize information stored in the network) than the present public (switched) networks. Another characteristic of the Intelligent Network is that the network architecture somehow draws a distinction between, on the one hand, the operations concerning the switching itself and, on the other hand, the stored data and its processing. Such a division makes it possible that, in principle, the organization providing network services can be different from the organization managing the physical network in which the services are provided. Conceptually, an Intelligent Network can be divided into three parts. The first part comprises the nodes switching traffic (performing connections), the second part contains the services provided by the network, and the third part consists of the internodal communication protocol, i.e. the "language" the machines use to communicate with one another. Since all services must be presented as a sequence of messages conforming with the protocol, the protocol defines the "intelligence" of the network.

Figure 1:
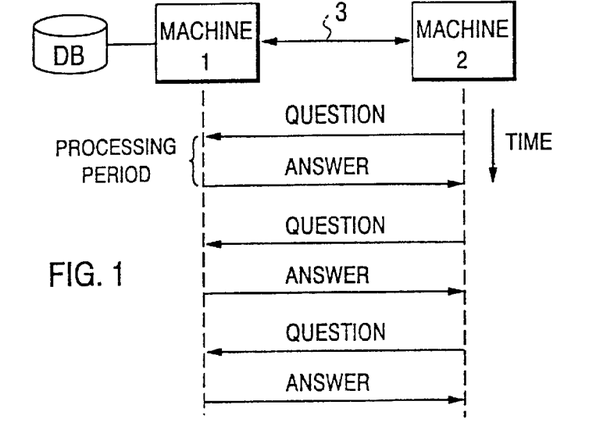
FIG. 1 illustrates the questions traffic between two machines.

In order to facilitate the understanding of the present invention, reference is first made to a simple basic situation illustrated in FIG. 1, wherein two machines (or network nodes) 1 and 2 are shown, the machines being interconnected by means of a signalling link 3. Machine 1 comprises a database DB, and machine 2 is a client asking questions from machine 1 by transmitting messages to machine 1 over the link 3. When machine 1 receives a question, it initiates a transaction resulting in an answer after a certain processing period. When the answer is ready, machine 1 transmits it to machine 2 over the link 3. Each answer costs machine 2 a certain sum.

Figure 2A:
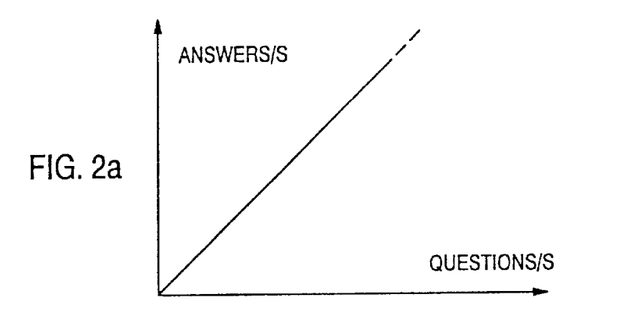
FIG. 2a illustrates a response of a hypothetical machine to service requests.
Figure 2B:
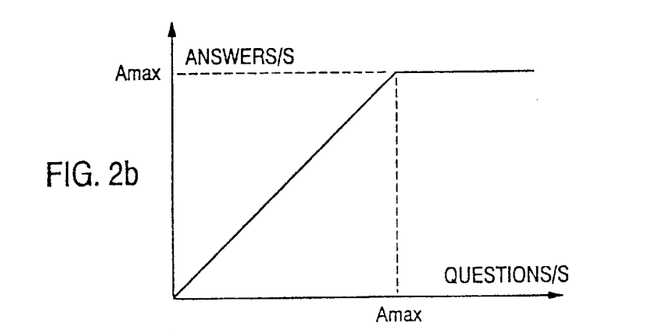
FIG. 2b illustrates a response of an omnipotent machine to service requests.
Figure 2C:
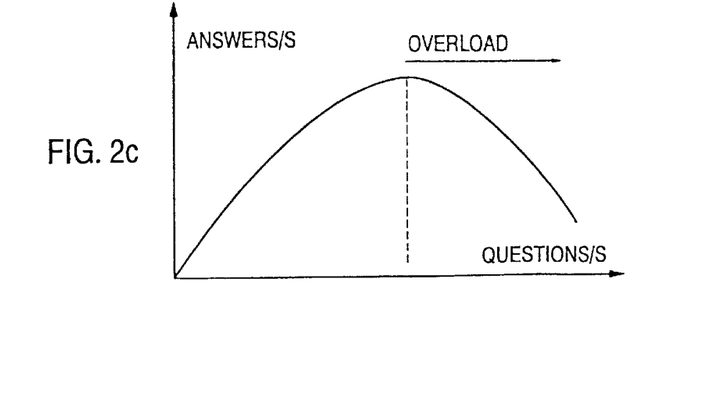
FIG. 2c illustrates a response of a real machine to service requests.

A theoretical omnipotent machine 1 would answer each question immediately so that the correlation between the questions rate (questions per time unit) and the answering rate (answers per time unit) would look like the description in FIG. 2a. However, there is in practice a limit to how fast machine 1 can provide answers. Taking this into account, the response curve of the omnipotent machine 1 becomes like the one shown in FIG. 2b. When the questions rate exceeds a certain threshold Amax corresponding to the highest possible answering rate, the latter remains constant, i.e. some of the questions will not be answered. However, this situation does not correspond to a real situation, either. In practice, the situation is such that as the questions rate exceeds a certain threshold value for a long period of time, machine 1 becomes overloaded so that the increasing questions rate further reduces the answering rate. This situation is illustrated in FIG. 2c. The decreasing answering rate is due to the fact that the machine starts wasting its resources, for example in such a way that it reserves more and more free memory for storing the questions, so there will be correspondingly less and less memory available for computing the answers. The threshold value of the questions rate at which an overload situation occurs is not constant, but it depends on how much of the capacity of machine 1 is dedicated to answering. For example, the threshold value is lower than usual when the database DB of machine 1 is being updated.

The purpose of any overload prevention method is to make the curve (FIG. 2c) describing a real situation resemble as closely as possible the curve (FIG. 2b) describing an ideal situation. On the other hand, it is reasonable to provide the overload prevention of machine 1 partly in machine 2, so that machine 2 would not have to load the transmission connection between the machines by transmitting messages that would be discarded by machine 1.

Suppose that in order to protect itself, the overloaded machine 1 transmits to machine 2 a restriction or filtering request with which it requests machine 2 to reduce the number of questions to be transmitted. Such a request typically contains two restriction parameters: the upper limit of the questions rate U (i.e. the upper limit of the number of questions performed per time unit) and the duration of the filtration T (i.e. of the restriction). When machine 2 receives such a request, it begins to filter (restrict) the questions traffic so that the questions rate will be at most U, so that part of the questions will fail (they will not even reach machine 1). Machine 2 continues this restriction operation for the period of time T indicated in the restriction request. If machine 2 receives a new request during this period, the upper limit of the questions rate and the interval will be updated to correspond to the new values. Instead of the upper limit of the questions rate, the parameter U may also indicate the proportion of all service request messages machine 2 should transmit to machine 1. For the sake of clarity, only the former meaning (upper limit of the questions rate) will be used hereinafter for the parameter U, unless otherwise mentioned.

When machine 2 uses the above-described overload prevention mechanism, it has two problems.

The first problem is how to select the aforementioned parameters U and T. A long filtration time T and a low value of the parameter U diminish the overload, but they also entail a clearly lower revenue for machine 1. On the other hand, a short filtration time and a higher value for the parameter U do not necessarily reduce the number of questions sufficiently for the overloading situation to be cleared up, and an overloading situation also means a lower revenue.

Figure 3:
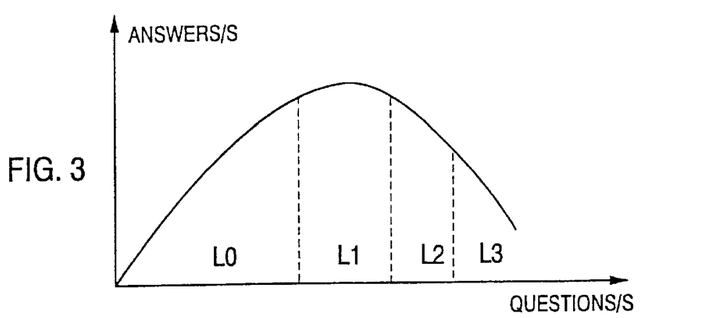
FIG. 3 illustrates the division into different load levels, performed in a node.

A simple way of eliminating this problem is to divide the response characteristic into consecutive overload regions Ln (n=0,1,2 . . . ) according to FIG. 3, each of the regions having its own values for the parameters U and T. If, at all times, machine 1 is able to determine its own load level, then the restriction parameters can be stored in the machine in a format (Ln: T, U), so that the machine can retrieve the required values of the parameters T and U on the basis of the load level Ln. However, this does not quite eliminate the aforementioned problem, but shifts the trouble of selecting the parameters to the operator. There are also methods by means of which the parameters can be selected automatically, based on the utilization ratio of the machine.

The other problem relates to when to send and when not to send restriction requests. Machine 1 should transmit the first restriction request when it is close to becoming overloaded. It should then send a restriction request either when the restriction period T expires (if the overload condition is still on) or when the restriction parameters change. Machine 1 should not transmit new restriction requests if machine 2 restricts the questions correctly (with the right threshold value for the questions rate and the right filtration time T). However, since there is no feedback, machine 1 cannot know if and how machine 2 restricts the questions. If machine 2 is the only source of questions, then machine 1 can solve the problem by monitoring the questions rate and by transmitting a new restriction request when the rate of the incoming questions exceeds the allowed threshold value U. If there are several machines transmitting questions, then efficient book-keeping is required to monitor the traffic and this makes the arrangement complicated.

This second problem is thus of the synchronization type, since machine 1 must keep up to date (i.e. synchronize) the restriction entity that is in a remote machine according to the loading situation of machine 1 at each moment.

The overload prevention in the Intelligent Network operates in a manner that is very similar to the above-described example. The Intelligent Network architecture is based on service switching points (SSP) and service control points (SCP) that make decisions concerning for example the routing and the charging of the calls. The Service Control Points, which are typically clearly fewer in number than the SSPs, contain knowledge of what the different services do and how to access the data that the services need. In an Intelligent Network, a Service Control Point is like the machine 1 of the above-described example, containing a database, and the SSP is like the machine 2 that asks questions. The above-described synchronization is also a problem in the Intelligent Network since the communication protocol between the nodes is not reliable in this respect.

Figure 4A:
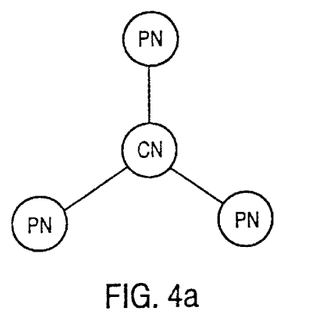
FIG. 4a shows a star network comprising four nodes.
Figure 4B:
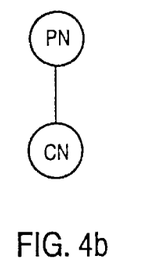
FIG. 4b shows a star network in its simplest form.
Figure 4C:
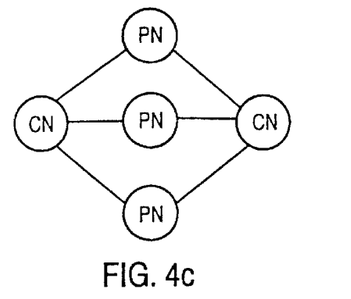
FIG. 4c shows a star network comprising two superimposed star networks sharing peripheral nodes.

The above-described example concerned a network that was as simple as possible with respect to its topology. For example an Intelligent Network is a network with a typically star topology. A star network basically comprises two kinds of nodes: central nodes and peripheral nodes. Peripheral nodes generate traffic that flows towards the central node. When the Intelligent Network comprises more than one SCP, the architecture corresponds to several superimposed star networks sharing peripheral nodes. FIGS. 4a to 4c illustrate the above-described alternatives with reference CN (in the IN: SCP) denoting a central node and reference PN (in the IN: SSP) denoting a peripheral node. FIG. 4a shows a star network having one central node CN and three peripheral nodes PN. FIG. 4b shows a star network in its simplest form corresponding to the example of FIG. 1 (one central node and one peripheral node), and FIG. 4c shows two star networks sharing peripheral nodes PN.

In addition to the Intelligent Network, many other networks have a star topology. Examples of such networks include a network formed of a satellite and earth stations, wherein the satellite switches traffic generated by the earth stations, or a network consisting of a base station controller and base stations of a cellular network.

In some known (intelligent) networks, the above-described synchronization is implemented with a broadcasting method, wherein the central node transmits a restriction request to all the peripheral nodes connected thereto whenever its loading situation changes (or the restriction parameters change for some other reason, for example when the operator changes them) and the peripheral nodes respond to each restriction request they receive with an acknowledgment. The central node keeps a record of the acknowledgement messages, and if some nodes have not transmitted an acknowledgement message within a certain control period, the central node retransmits the restriction request to these nodes. The broadcast is repeated again to all the nodes as the restriction period (T) expires if the overload condition is still on. However, it is difficult to implement such a method in a typical network comprising several nodes, and in addition the method is not reliable, since a peripheral node may be damaged for example immediately after it has transmitted the acknowledgement message, in which case the central node will not be informed of the situation. Another drawback of such a method is that the central node also transmits a restriction request in vain to nodes which cause an insignificant loading on the central node (this could only be avoided by monitoring separately the traffic from each peripheral node, which, however, is a complicated and therefore undesirable solution).

The latter problem has been solved in some known Intelligent Networks in such a way that as the restriction parameters change, a restriction request is always transmitted in response to a service request message (which may be for example the question of the example provided in the beginning) sent by a peripheral node. Therefore, the peripheral nodes with light traffic will correspondingly receive fewer restriction requests. The drawback of this method is, however, that it causes a great deal of traffic over the signalling link between the central node and a peripheral node. It also causes a large number of updates in the peripheral node.

SUMMARY OF THE INVENTION

The purpose of the present invention is to provide a new kind of arrangement by means of which the above-described drawbacks can be eliminated and synchronization can be implemented in a simple and sufficiently reliable manner (i.e. that the loading machine operates as well as possible in accordance with the current load level of the loaded machine). This objective is achieved with the method according to the invention, the first embodiment of the invention being characterized in that the service node transmits a restriction request to a predetermined proportion of the total number of the service request messages fulfilling the given criteria, so that each individual service request message has a predetermined probability of triggering the transmission of a restriction request, the probabilities being selected so that the total number of the restriction requests is smaller than the total number of the service requests. The second embodiment is in turn characterized in that the service node retransmits the restriction request to all the nodes connected thereto in such a way that the retransmission is performed to a predetermined proportion of the total number of service requests received by the service node, so that said transmission is provided to an individual service request with a predetermined probability that is less than one. The arrangement according to the invention is in turn characterized in that the network service node comprises at least one random number generator means and at least one comparing means, whereupon the comparing means compare a number stored beforehand in the node with a random number generated by the random number generator means, and control the transmission of the restriction request message on the basis of the result of the comparison.

The idea of the invention is to transmit a restriction request from a network service node in such a way that it is transmitted only to a predetermined proportion of the total number of the service request messages, so that a response to an individual service request message is provided with a predetermined probability that is less than one at least part of the time, but typically for most of the time. Therefore the nodes loading the service node the most also have the greatest probability of receiving a restriction request. It is also possible that the principle is applied only to a certain part of the traffic (to service request messages fulfilling predetermined criteria).

A restriction request is provided whenever the restriction parameters have changed or the restriction period expires and there is still an overloading situation in the service node. However, the latter alternative is only true for the "active" method, since there is no need to monitor the expiry of the restriction period in the "reactive" method.

Due to the arrangement according to the invention, synchronization can be implemented in a reliable and simple manner so that the connections between the nodes are not overloaded. The arrangement according to the invention also guarantees that no unnecessary restriction requests are transmitted to nodes causing light loading. The saved bandwidth can be used for the transmission of other messages in the network.

A farther advantage of the arrangement according to the invention over the known arrangements is that it requires changes only in the service node of the network, and that these changes are minor. No changes are required, for example, in the internodal protocol.

It should also be noted that in an individual overloading situation, the first restriction request can be transmitted either automatically (without an incoming service request) or in response to an incoming service request. Furthermore, the restriction request may either be an individual message or it may be contained in a message that would in any case be provided in response to a service request message.

BRIEF DESCRIPTION OF THE DRAWINGS

The invention and its preferred embodiments will be described in greater detail below with reference to the examples according to the accompanying drawings, in which.

DETAILED DESCRIPTION OF THE INVENTION

Figure 5:
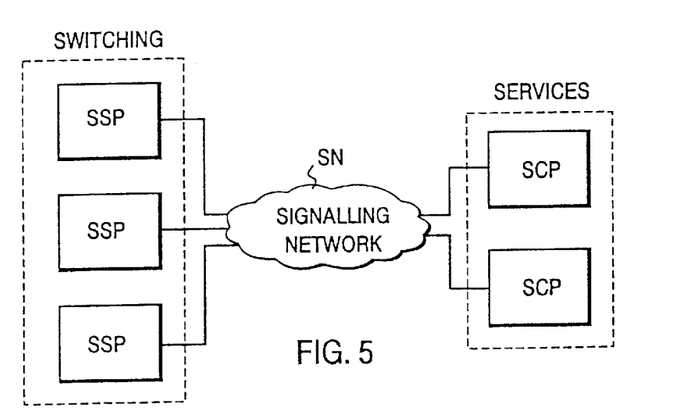
FIG. 5 shows an intelligent network comprising two central nodes and three peripheral nodes.
Figure 6:
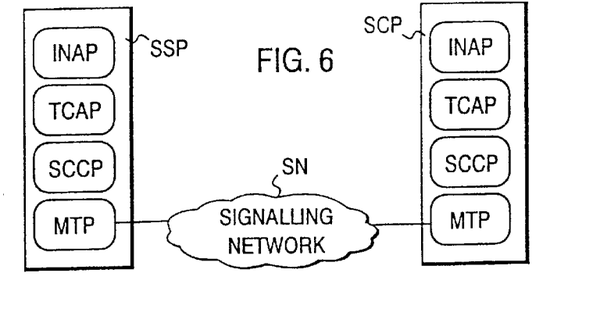
FIG. 6 illustrates the communication between the nodes in an intelligent network.

In the following, the invention will be described in greater detail by using as an example a (star) Intelligent Network wherein calls are transmitted. As described above, the architecture of the Intelligent Network is based on service switching points (SSP) and service control points (SCP). These nodes are interconnected by means of a network SN according to the signalling system number 7 (SS7; described in greater detail in the CCITT Blue Book *Specifications of Signalling System No. 7*, Melbourne 1988), in the manner shown in FIG. 5. In mutual communication the SSP and the SCP utilize the Intelligent Network application protocol (INAP) described in the ETSI (European Telecommunications Standard Institute) standard ETSI IN CS1 INAP Part 1: Protocol Specification, Draft prETS 300 374-1, November 1993. In the SS7 protocol stack illustrated in FIG. 6, the INAP is the upmost layer situated on top of the Transaction Capabilities Application Part (TCAP), the Signalling Connection Control Part (SCCP) and the Message Transfer Part (MTP). The SSP is generally a commercial telephone exchange with a modified call control software, and the SCP comprises the service control logic and has access to the services database. Call traffic passes through the SSPs. The Service Control Points make some of the decisions concerning the routing and the charging of the calls. During a call in the Intelligent Network, there may be one or more INAP dialogues between the SSP and the SCP. Each of these dialogues begins with a predetermined message (initial detection point message) hereinafter referred to as an initial message.

When the network traffic is heavy, the SCP may become overloaded. In order to prevent this, the Intelligent Network has a decentralized load control system that uses a so-called call gapping method to restrict messages arriving towards the SCP (the term "call gapping" is used in several international standards, for example in the CCITT Blue Book, Recommendation E. 412, §3.1.1.2 and Recommendation Q. 542, §5.4.4.3). The call gapping method is a known traffic control method that is based on the frequency of call occurrence (rate of arrival), in which method the number of calls is limited in such a way that at most a certain maximum number of calls per time unit are allowed to pass. In addition to the aforementioned standards, such a method is also described for example in U.S. Pat. No. 4,224,479. The SCP monitors the loading situation and the SSPs restrict the traffic, if necessary, by rejecting some of the calls before the related dialogue is started.

Figure 7A:
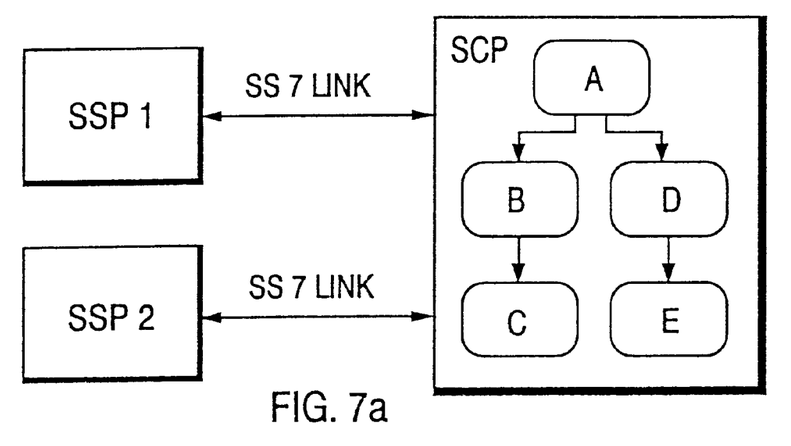
FIG. 7a illustrates an intelligent network and the formation of its central node from functional blocks situated at different hierarchical levels.
Figure 7B:
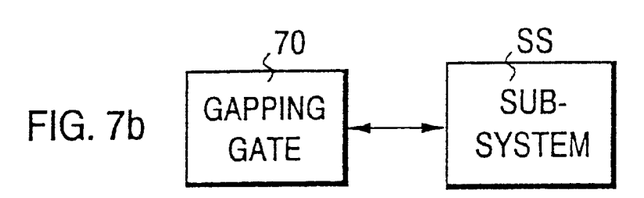
FIG. 7b shows the division of one block shown in FIG. 7a with respect to the call restriction function.

Assume that the network comprises, in the manner shown in FIG. 7a, two nodes SSP1 and SSP2, and one SCP. The SCP can be considered to contain a hierarchy of functional blocks A to E. Each block can be considered to comprise, according to FIG. 7b, a gapping gate 70 operating according to the call gapping method, and a subsystem SS located behind the gapping gate. All telecommunication with the subsystem passes through the gapping gate, and the gapping gate gathers statistics about the traffic, the condition of the subsystem, and the condition of the other parts of the SCP. From this data the gapping gate calculates the load level of the subsystem in question.

Figure 8:
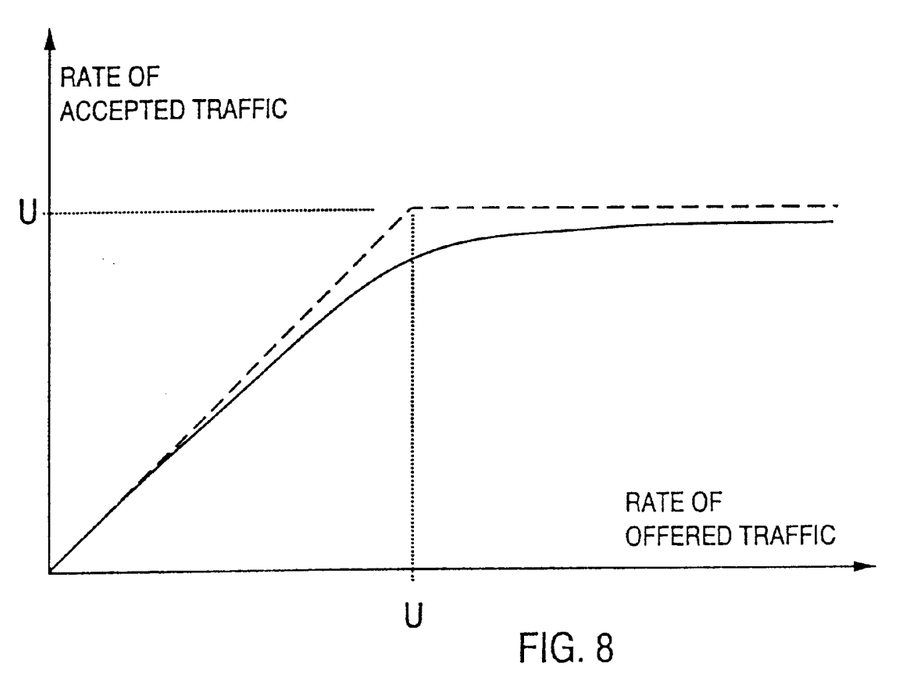
FIG. 8 illustrates the operation of a known traffic restriction method.

The normal load level of the subsystem is L0 (cf. FIG. 3). When the load level changes from L0 to L1, the gapping gate will try to limit the traffic by sending a call gapping request to both SSPs. Such a request typically comprises the following groups of parameters: (1) gap criteria, (2) gap indicators, and (3) gap treatment. The gap criteria identify the portion of the traffic that is the object of the call gapping operation, for example, only calls starting with 800 can be limited. Gap indicators define the maximum number of initial messages (calls) U allowed in a time unit (in fact the gap indicators define the shortest allowable interval I=1/U between two successive initial messages, which, in principle, amounts to the same thing) and the gap duration T, whereupon the rate of initial messages between the arrival of the call gapping request and the end of the duration can be at most the aforementioned maximum. The operation of this call gapping method is illustrated in FIG. 8. When the traffic rate (shown on the horizontal axis) offered by the network is less than the aforementioned maximum U, there is no call gapping. When the offered traffic rate exceeds this value, the SSP rejects some of the calls so that the rate of the transmitted traffic (shown on the vertical axis) will be U. An ideal case is described by a broken line, and a real situation by a continuous line. In practice, the characteristic is a continuous approximation of the piecewise linear characteristic of the ideal case. This is due to the fact that the offered traffic is not divided evenly on the time axis.

The gap treatment parameters determine what to do with rejected calls. For example, the speech channel of a rejected call can be connected to a voice announcement or to a busy tone. In addition, the call gapping request contains a control field which indicates whether the call gapping request comes from an automatic overload prevention mechanism or from an SCP operator. The above-described groups of parameters are disclosed in the aforementioned standard ETSI IN CS1 INAP Part 1: Protocol Specification, Draft prETS 300 374-1, November 1993, Item 7.3.6, which is referred to for a more detailed description.

Figure 9:
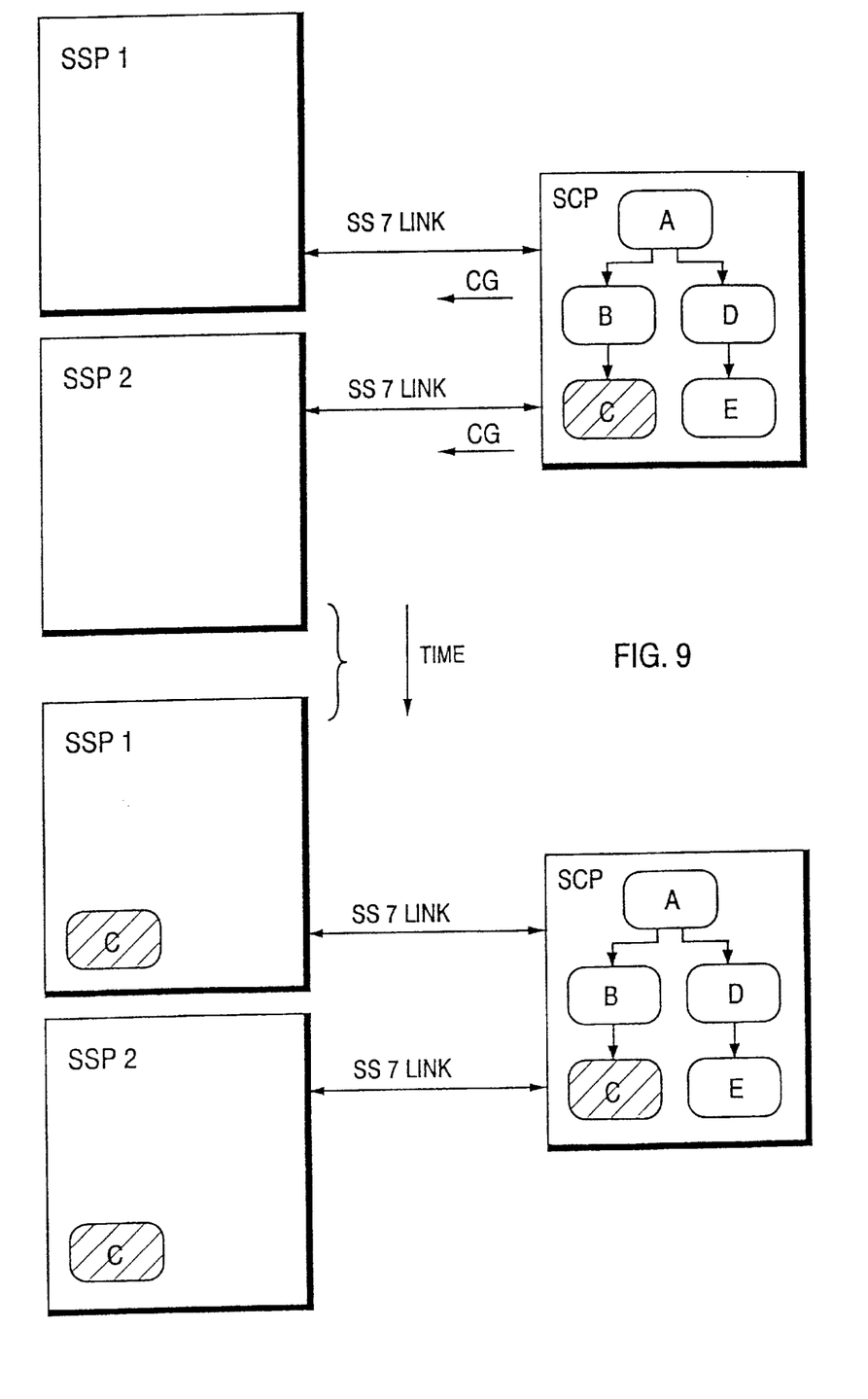
FIGS. 9 and 10 illustrate the operation of an intelligent network in a loading situation.

When a call gapping request arrives at an SSP, the SSP creates, based on the information it has received, an image of the sending gapping gate (i.e. the subsystem controlled by the gapping gate). This is illustrated in FIG. 9, wherein the overloaded block (C) is denoted by hatching and the call gapping request transmitted by the SCP by the reference CG. By means of the gap criteria and this image, the SSP identifies the traffic that is directed to the overloaded subsystem and restricts the rate of this traffic. When the period of time indicated in the call gapping request expires, the SSP destroys the image of the subsystem from its memory.

The gapping gate in the SCP is "static", i.e. it exists all the time. The image of the gapping gate (or the corresponding subsystem) in the SSP is temporary; the SSP creates the image when it receives a call gapping request and destroys it when the duration T specified in the call gapping request has expired. When the SSP receives a call gapping request containing the same gap criteria as an already existing image, the other parameters of that image will be updated to correspond to the new ones.

Another approach is to view the images (copies) in the SSP as objects with two states: active and passive. When an image receives a call gapping request, it turns active and starts to restrict traffic. When the image is in the active state it can receive several call gapping requests from the SCP. When the duration specified in the last call gapping request expires, the image turns passive again.

Figure 10:
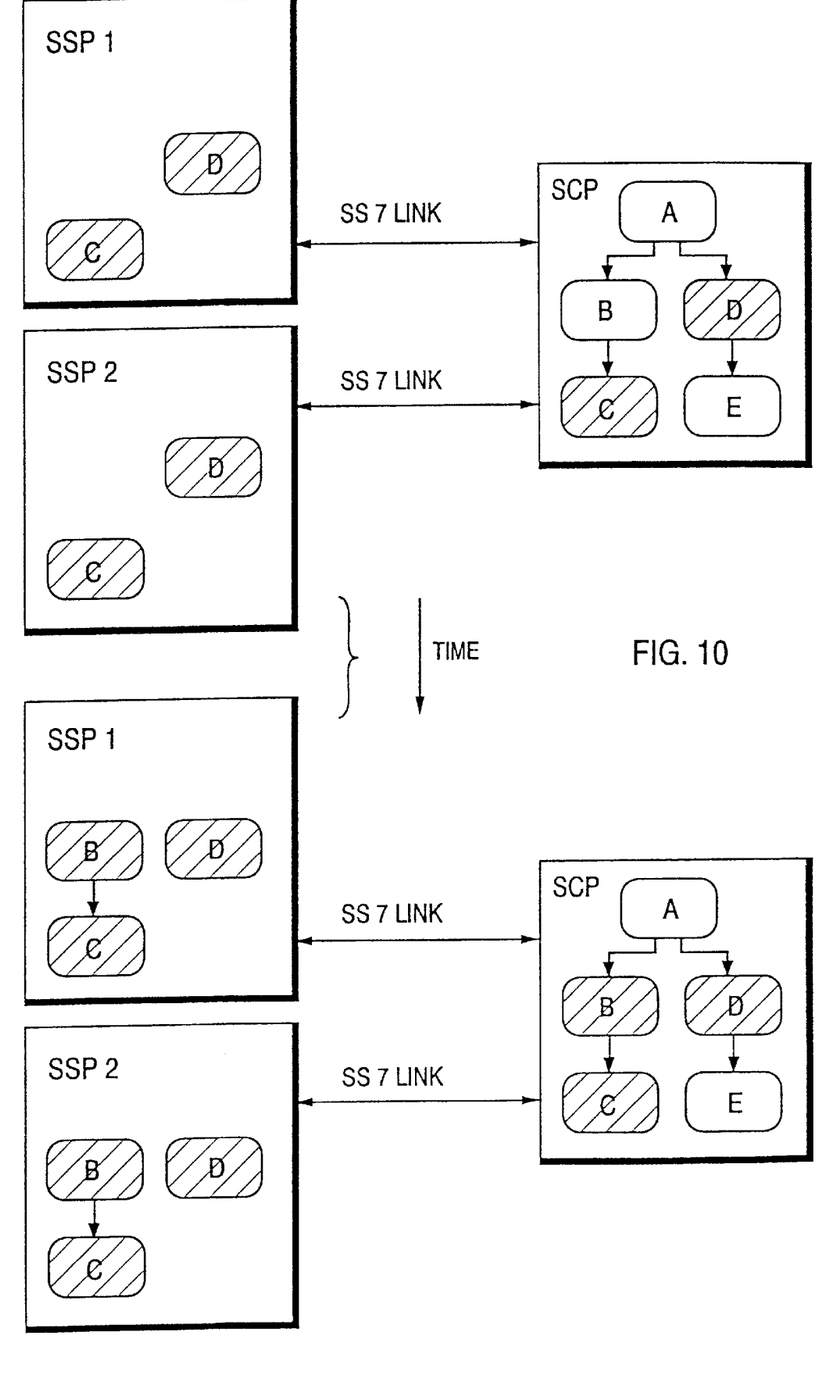

When two of the subsystems in the SCP are simultaneously overloaded, there is correspondingly an image (copy) of each gate in the SSP. As more and more subsystems become overloaded, the logical structure of the images in the SSP starts to resemble the hierarchy of the gapping gates in the SCP. This process is illustrated in FIG. 10.

The aforementioned ETSI standard (Item 7.3.19.1.1) also defines a special "call gap encountered" indicator, which the SSP adds to the initial message if the call has passed through the gapping gate. This indicator thus informs the SCP that the concerned SSP performs call gapping. However, the SCP cannot be certain that the SSP performs the call gapping with the correct parameters, wherefore the SCP cannot trust this indicator in making decisions about whether to send a call gapping request or not. An example of this is a network which comprises one SCP and several SSPs, and in which network one of the SCP subsystems is on the load level L1 having a corresponding upper limit U, to be indicated to the SSP, of e.g. 10 initial messages (10 calls) per second. If the load level now changes from L1 to L2, having a corresponding upper limit of e.g. 5 initial messages (5 calls) per second, the SCP transmits a call gapping request CG containing a new upper limit to each SSP. In this situation, if the data of some SSPs will not be updated, for example due to faults, then these SSPs continue restricting the traffic with the old (higher) value of U until the duration indicated in the call gapping request expires. Due to this, the concerned subsystem may move further to the next load level L3. The SCP cannot distinguish between updated and non-updated SSPs, since the same indicator is received from all SSPs.

There have been efforts to solve the problem in the manner described in the beginning, so that the same call gapping request is repeated after each initial message arriving from the SSP. However, this arrangement produces (a) more traffic over the signalling link between the SCP and the SSP, and (b) repeated updating of the information (subsystem images), concerning the SCP, in the SSP.

The operation according to the present invention proceeds in such a way that a call gapping request is transmitted in response to only a predetermined proportion of the initial messages (or corresponding service requests). This predetermined proportion will be described below with the letter p ($0<p\leq1$). As it is apparent from the above, the objective of the overload prevention mechanism is to set an upper limit U for the traffic rate from an individual SSP. The inverse of the product of the incoming traffic rate and the parameter p thus represents an average time interval between two successive call gapping requests (updating interval). When the traffic rate from an SSP exceeds the value U, i.e. when a call gapping request should be transmitted to the SSP, the average updating interval is less than $1/(pU)$.

The operation according to the invention is preferably implemented in such a way that for each incoming initial message, a random number R, for which $0\leq R\leq1$ holds, is generated in the central node SCP. If this number is smaller than the parameter p, a call gapping request is transmitted. The decision-making can thus be described in the following manner:

send the call gapping request, if R<p, wherein 0≦R≦1, and 0<p≦1.

Figure 11:
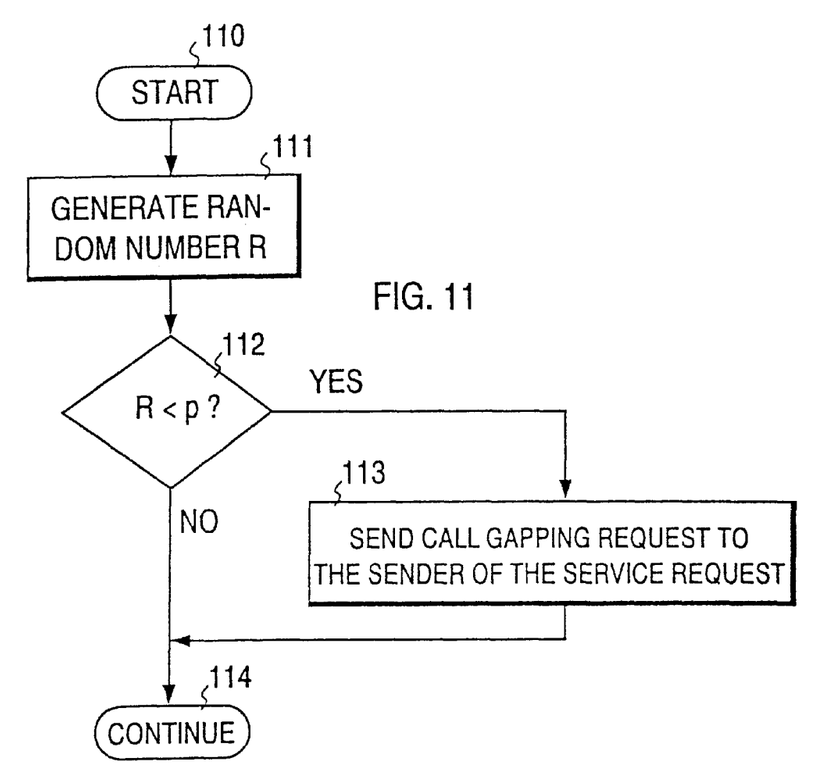
FIG. 11 is a flow chart illustrating the operation of the method according to the invention in a network central node.

FIG. 11 illustrates the operation according to the invention within each subsystem of the central node. In phase 111 a random number R is generated, whereafter it is examined in phase 112 whether the random number is smaller than the parameter p. If the result of the comparison is positive, a call gapping request is transmitted to the node which transmitted the service requests (phase 113). If the result of the comparison is negative, no transmission is done, but normal operation is continued (phase 114).

Figure 12:
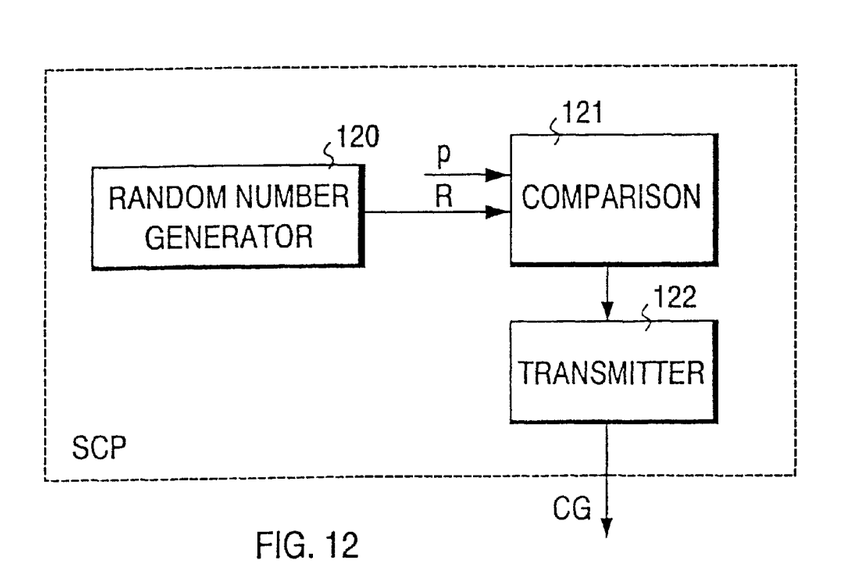
FIG. 12 shows means to be added to the network central node.

As shown in FIG. 12, random number generator means 120 generating a random number R, and comparing means 121 comparing the random number with the parameter p are added to the central node. The comparing means control transmitting means 122, which transmit the call gapping request CG forward. In the case of a central node of an Intelligent Network, each subsystem may have its own incorporated random number generator and comparing means, or all subsystems may share the same means.

Instead of the random number generator, it is also possible to use counters counting initial messages. For example, if p=1/10, every tenth initial message would trigger the transmission of a call gapping request. The drawback of counters is, however, that the distribution of the call gapping requests to be transmitted is too regular with respect to the distribution of the incoming initial messages.

The selection of the parameter p is discussed in greater detail below.

Assume that the traffic to the central node arrives from a source having a Poisson distribution that is known per se and transmitting on average r initial messages per second (the average speed is r). The objective is to select the parameter p in such a way that the source receives one call gapping request every d seconds (whereupon d is the average updating interval of the restriction parameters). Since the source transmits rd initial messages within d seconds, the objective can be achieved by selecting p=1/(rd) (assuming that rd≧1). When the traffic arrives from N identical Poisson sources, the central node receives Nrd initial messages in d seconds. In order to achieve the above goal, the central node must correspondingly transmit N call gapping requests during that time (p=N/(Nrd)=1/(rd)).

The receiver of the central node does not thereby distinguish between the different sources (peripheral nodes), but when the parameter p is constant, each initial message will trigger the transmission of a call gapping request with an equal probability p ((0<p≦1). If p≧1/(rd), each transmitting process the rate of which exceeds r receives on average at least one response within d seconds. If the transmitting process is not Poisson-distributed but arbitrary, the number of messages it sends within d seconds is also arbitrary. A reply cannot thereby be guaranteed within d seconds, but within 1/p messages.

Since the average interval between call gapping requests is 1/(rp) seconds, the parameter p can be determined according to the worst possible case (r=U), whereupon the interval is the longest. (The interval is naturally even longer when the rate of the source is less than U, but in such a case the call gapping requests are not intended to affect the source rate. The worst case is thus when the source rate is equal to the threshold U.) The parameter p can thus be determined by first choosing the average updating interval d on the basis of the source rate threshold U and by calculating then the value of p from the equation $$p=1/(Ud). \quad (1)$$

If possible, the value d should be at least one order of magnitude higher than 1/U, and it should also be less than the gap duration, i.e. (10/U)<d<T.

For example, if U=10 initial messages/s, the gap duration T=24 seconds, and the chosen value of d is 2 seconds, then the parameter p will be p=1/20. This means that in order to keep the peripheral nodes (SSP) updated with an accuracy of 2 seconds, only 5 percent of the messages must be responded to with a call gapping request.

It should also be noted that, strictly speaking, the parameter p is not constant, but it depends on the restriction parameters U and d. However, it can be said that p has a constant value whenever the aforementioned restriction parameters are fixed. (The restriction parameters change when the load level changes, as described above. There may also be more load levels than described above, so that in practice the parameters can change almost continuously).

If the parameter U indicates the proportion of the traffic a peripheral node should forward to the central node, and if the traffic rate from the peripheral node to the central node is for example r (initial messages/s) and the peripheral node restricts the traffic correctly, the traffic rate after the call gapping is rU (initial messages/s). The formula of the parameter p will then be p=1/(fUd), wherein f is the traffic rate selected by the operator for each load level Ln or selected by the node automatically, and wherein fUd>1.

The parameter p can be selected as a periodic function of time p(t) with a constant period $T_p$ that is at most the gap duration T and with a mean value E[p(t)] that is, according to what is described above, at least 1/(Ud), i.e.

$$p(t)=p(t+nT_p), \text{ where } T_p \leq T;$$

$$E[p(t)] \geq 1/(Ud).$$

n is an integer (n=0,1,2, . . . ) determining the period in question.

Figure 13A:
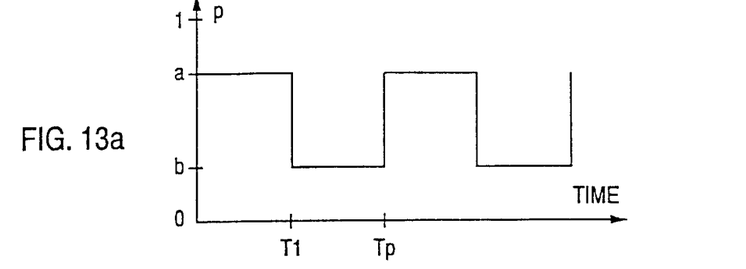
FIGS. 13a and 13b show two alternatives for a parameter used in the method according to the invention when the parameter is periodic.
Figure 13B:
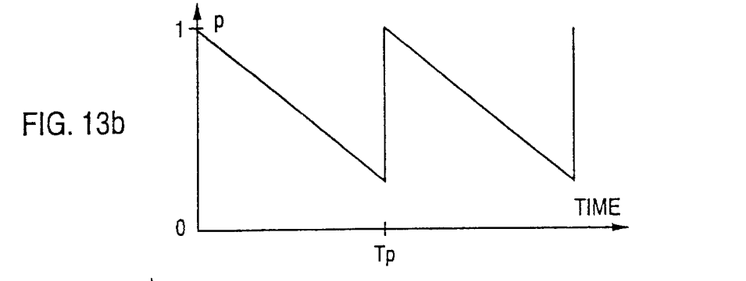

Two alternatives for such a periodic function are shown in FIGS. 13a and 13b, wherein time is shown on the horizontal axis and parameter p on the vertical axis.

In the case of FIG. 13a, the parameter p varies according to a square wave, so that the period length $T_p$ is divided into two parts. In the first part p=a, and in the second part p=b.

$$p(t) = \begin{cases} a, & \text{if } nT_p \leq t \leq T_1 + nT_p \\ b & \text{otherwise} \end{cases}$$

$$E[p(t)] = \frac{T_1(a-b)}{T_p} + b$$

In particular, when a=1 and b=0, the behaviour of the central node is completely deterministic. The central node alternates between two different states in such a way that in the first part of the period (length T1) it transmits a call gapping request in response to each initial message and in the second part of the period (length $T_p$−T1) it transmits no call gapping requests. The condition set for the mean value E[p(t)]≧1/(Ud) then translates into the condition for the ratio of the parts of the period:

$$(T_1/T_p) \geq 1/(Ud).$$

In the case of FIG. 13b, the parameter p varies like a saw-tooth wave:

$$E[p(t)] = 1 - \frac{CT_p}{2}$$

-continued $$p(t) = \begin{cases} 1 - C(t - nT_p), & \text{if } nT_p \le t \le (n+1)T_p \\ 1, & \text{if } t = nT_p \end{cases}$$

wherein n is an integer (n=0,1,2, . . . ), determining the period in question.

In this case, the closer p is to its peak value, the faster the response (i.e. call gapping request) to a source with an excessive rate is obtained.

When p is periodic, the period $T_p$ is preferably selected in such a way that the gap duration T corresponds to an integral number of periods $T_p$ (i.e. $T=kT_p$, k=1,2,3 . . . ). The beginning of the gap duration (or the end of the preceding call gapping period) is then likely to coincide with the moment the parameter p is also at its peak value.

The parameter p can also be selected to be adaptive so that it depends on the rate of the total traffic to the node. Such alternatives are described in FIGS. 14a to 14c, wherein the total traffic rate to the central node is shown on the horizontal axis and the parameter p on the vertical axis.

Figure 14A:
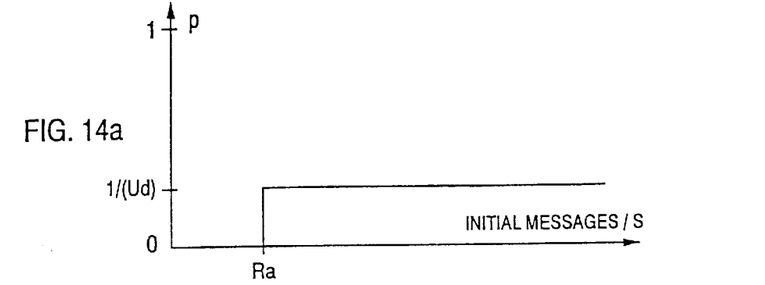
FIGS. 14a, 14b and 14c show three different alternatives for the parameter used in the method according to the invention when the parameter is adaptive.
Figure 14B:
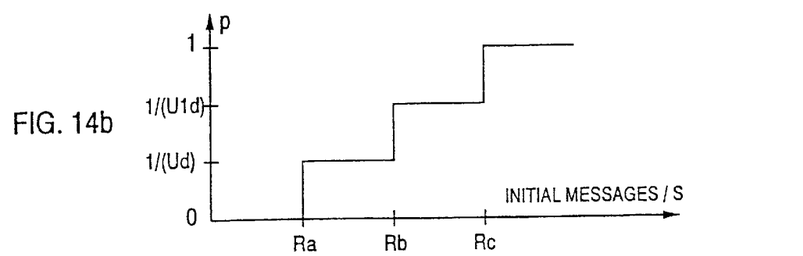
Figure 14C:
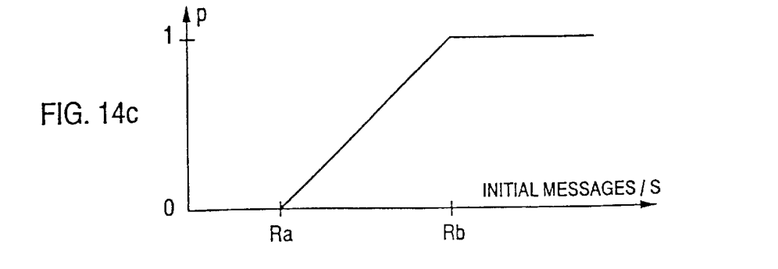

In the case of FIG. 14a, the central node SCP starts transmitting call gapping requests only when the total traffic rate exceeds a certain threshold Ra. In the case of FIG. 14b, the central node SCP also starts transmitting call gapping requests only when the total traffic rate exceeds a certain threshold Ra, but furthermore, the proportion (i.e. p) of the call gapping requests to be transmitted increases stepwise as the total traffic rate exceeds the thresholds Rb and Rc. In the case of FIG. 14c, the value of the parameter p increases linearly from zero to one between the thresholds Ra and Rb. In the case of FIG. 14a, the advantage is that no unnecessary call gapping requests are sent to nodes causing light loading. In the cases of FIGS. 14b and 14c, another advantage is that even the most difficult overloading situations can be effectively handled.

As it was mentioned above, the receiver of the central node does not distinguish between the different sources (peripheral nodes). This also means that the central node only has to monitor the total rate of messages arriving from n sources, without having to monitor the rate of messages from individual nodes. (The initial message does contain a field indicating the transmitter, so that the traffic can be monitored specifically for each node, but it is a far more complicated solution because it requires a great deal of book-keeping in the central node.)

The principle according to the invention can also be applied in the above-described known broadcasting method in such a way that the central node does not maintain a record of which node has transmitted an acknowledgement message, but the central node performs a rebroadcast randomly according to the invention, in response to a predetermined proportion of initial messages. Each broadcast consists of N call gapping requests, where N is the number of peripheral nodes SSP connected to the central node, so that each peripheral node will receive one call gapping request. In this case, the parameter p is selected on the basis of the above-described formula (1) by dividing it by N, i.e.

p=1/(NUd), wherein d is the average updating interval of the restriction parameters of the peripheral node, when the total traffic from the peripheral nodes is NU. For example, if N=5, U=10 initial messages/s, T=24, and d has the chosen value of 2 seconds, then p=1/100 (i.e. rebroadcast is performed on one percent of all incoming service requests).

In the manner described above, the book-keeping concerning acknowledgement messages can be eliminated, since it is this feature that makes the known broadcasting method complicated.

In this embodiment according to the invention, the central node may transmit the first call gapping request message concerning an overloading situation automatically as soon as the restriction parameters change, but it is simpler, however, to provide even the first call gapping request to each peripheral node in response to the initial messages transmitted by the peripheral nodes.

Even though the invention is described above with reference to the examples according to the accompanying drawings, it is clear that the invention is not restricted thereto, but it may be modified within the scope of the inventive idea disclosed above and in the appended claims. The method according to the invention can be applied for example to a certain part of the traffic, as it is disclosed above. Since the arrangement according to the invention is in principle applicable in any telecommunications network having the basic situation according to FIG. 1, the central node is referred to in the appended claims as a service node (not restricted to an Intelligent Network) and the peripheral node in turn as a node (not restricted to a star network). The service requests must also be understood to relate generally to any services the performance of which loads the service node.

What is claimed is:

1. A method of preventing an overload in a node of a telecommunications network, the network comprising at least one service node and at least one other node connected to the at least one service node, said method comprising the steps of receiving, at the at least one service node, service requests from the at least one other node connected to the at least one service node, transmitting restriction requests from the at least one service node to the at least one other node connected thereto, each restriction request comprising information on how the at least one other node should restrict the number of service requests the at least one other node transmits towards the at least one service node, transmitting a new restriction request at least whenever said information changes, restricting the number of service requests transmitted to the at least one service node from the at least one other node, said step of transmitting said restriction requests comprising transmitting restriction requests in response to a predetermined proportion of the total number of the received service requests fulfilling a predetermined criterion, by defining for each individual one of said received service requests a predetermined probability of triggering a transmission of a restriction request, so that a total number of said transmitted restriction requests is smaller than the total number of said received service requests.

2. A method according to claim 1, wherein said step of transmitting comprises a step of transmitting restriction requests in response to only a predetermined proportion of the total number of all service requests.

3. A method according to claim 2, comprising a step of selecting said predetermined proportion in such a way that said predetermined portion is zero until a total rate of service requests arriving at the at least one service node reaches a predetermined threshold.

4. A method according to claim 3, wherein the value of said proportion increases after the total rate of service requests arriving at the at least one service node reaches said predetermined threshold.

5. A method according to claim 2, comprising a step of selecting said predetermined proportion in such a way that the value of said predetermined proportion changes periodically.

6. A method according to claim 1, comprising a step of selecting said predetermined proportion in such a way that it has a constant value p=1/(Ud), where U is the maximum allowed service request rate to be indicated in the restriction request, and d is the average interval between two successive restriction requests.

7. A method according to claim 6, comprising a step of selecting the average interval d between two successive restriction requests in such a way that (C1/U)<d<T, where T is a restriction period indicated in the restriction request, and C1 is a constant greater than one.

8. A method according to claim 7, wherein C1 is at least ten.

9. A method of preventing an overload in a node of a telecommunications network, the network comprising at least one service node and a plurality of other nodes connected to the at least one service node, said method comprising the steps of receiving, at the at least one service node, service requests from at least one of the other nodes connected to the at least one service node, transmitting restriction requests from the at least one service node to the at least one of the other nodes connected thereto, each restriction request comprising information on how the at least one of the other nodes should restrict the number of service requests the at least one of the other nodes transmits towards the at least one service node, transmitting a new restriction request from the at least one service node to all other nodes connected thereto at least whenever said information changes, restricting the number of service requests transmitted to the at least one service node from the at least one of the other nodes, retransmitting the restriction request from the at least one service node to all other nodes connected to the service node in response to a predetermined proportion of the total number of service requests received by the at least one service node, so that a predetermined probability of retransmitting a restriction in response to any individual received service request is less than one.

10. A method according to claim 9, comprising selecting said predetermined proportion in such a way that it has a constant value p=1/(NUd), where U is the maximum allowed rate of service requests to be indicated to an individual node in the restriction request, N is the number of nodes connected to the service node, and d is the average interval between two successive restriction requests when the total rate of service requests arriving at the service node is NU.

11. An arrangement in a node of a telecommunications network, the network comprising at least one service node and at least one other node from which the service node receives service requests, the service node transmitting restriction requests to the at least one other node connected thereto, so that the at least one other node restricts the number of service requests the at least one other node transmits towards the at least one service node in a time unit, each restriction request comprising information on how the at least one other node should perform a restriction, the at least one service node further comprising at least one random number generator means and at least one comparing means for comparing a number stored beforehand in the at least one service node with a random number generated by the random number generator means, and means for controlling the transmission of a restriction request on the basis of the result of the comparison.

* * * * *